United States Patent

Wilcox

[15] 3,671,813

[45] June 20, 1972

[54] PANEL BOARD SYSTEM AND COMPONENTS THEREOF WITH CONNECTOR AND INTEGRATED CIRCUIT DEVICE

[72] Inventor: Russell E. Wilcox, Norton, Mass.

[73] Assignee: Texas Instruments Incorporated, Dallas, Tex.

[22] Filed: Dec. 10, 1970

[21] Appl. No.: 96,809

[52] U.S. Cl.........................317/118, 174/DIG. 3, 339/17 CF, 339/176 MP

[51] Int. Cl...........................................................H05k 1/07

[58] Field of Search..............174/DIG. 3; 317/101 A, 101 D, 317/101 CM, 101 CC, 112, 118; 339/17 R, 17 C, 17 CF, 17 LC, 17 M, 176 R, 176 MP, 198 R, 198 P, 198 S

[56] References Cited

UNITED STATES PATENTS

| | | | |
|---|---|---|---|
| 3,319,166 | 5/1967 | Coleman | 317/101 CC |
| 3,370,203 | 2/1968 | Kravitz | 339/17 CF |
| 3,530,422 | 9/1970 | Goodman | 317/101 CC |
| 3,404,215 | 10/1968 | Burks | 317/101 A |
| 3,416,348 | 12/1968 | Carter | 174/DIG. 3 |

*Primary Examiner*—Lewis H. Myers
*Assistant Examiner*—Gerald P. Tolin
*Attorney*—Harold Levine, Edward J. Connors, Jr., John A. Haug, James P. McAndrews and Gerald B. Epstein

[57] ABSTRACT

A panel board system detachably mounts medium scale integrated circuit devices in connectors on a panel board in a manner which provides improved device density on the board while permitting the device circuits to be electrically interconnected by inexpensive wire-wrapping techniques. The integrated circuit devices have an integrated circuit chip mounted on a ceramic card and electrically connected to printed circuit paths on the card, the circuit paths terminating with small center-to-center spacings between the paths along an edge of the card. The connectors receive edges of the cards and have contacts on small center-to-center spacings detachably engaging respective circuit path terminations along the card edges. The connector contacts have terminal posts which extend from the connectors through panel board apertures, the contact terminal posts extending in a selected staggered relation to each other to provide sufficiently large center-to-center spacings between the posts to permit wire-wrap connections to be made to each post without interference with adjacent terminal posts extending through the panel board.

6 Claims, 7 Drawing Figures

INVENTOR.

BY Russell E. Wilcox

James P. Mc Andrews

Att'y.

INVENTOR.
Russell E. Wilcox
BY James P. McAndrews
Att'y.

PANEL BOARD SYSTEM AND COMPONENTS THEREOF WITH CONNECTOR AND INTEGRATED CIRCUIT DEVICE

Conventional dual-in-line i.c. devices have two rows of terminals extending in parallel relation from the bottoms of the devices. These terminals detachably fit into contact means in connectors mounted on a panel board, the connector contacts having terminal post portions extending through mating apertures in the panel board. In this arrangement, the rows of terminals are spaced 0.300 inches apart to accommodate an i.c. chip and electrical connections thereto between the terminal rows. The individual terminals are spaced 0.100 inches apart in each row and fit into contact means with similar spacing so that terminal posts extending from the contact means directly through the panel board apertures are also disposed in a pair of rows with 0.300 inches center-to-center spacing between rows and with 0.100 inches center-to-center spacing between posts in each row. Selected terminal posts extending through the panel board apertures are then electrically interconnected by wire-wrapping techniques for electrically interconnecting the various device circuits to build up a larger panel board circuit. The term "wire-wrapping" as used herein refers to a conventional panel board interconnection procedure in which, for example, a connecting wire has its opposite ends manually or machine wrapped tightly around respective terminal posts to make firm, retentive electrical connection to each of the posts primarily by reason of the tight nature of the wrap. Where wire wrapping is used in this conventional panel board system, very high quality electrical interconnections are inexpensively obtained between the device circuits and the devices are readily detached from the connectors for replacement as required. It is also found that a substantial number of the devices can be accommodated on a single panel board. For example, where i.c. devices have two rows of seven terminals each, the conventional i.c. connector occupies a panel board area 0.800 inches long by 0.500 inches wide and an average of 2.5 integrated circuit devices are accommodated on each square inch of the panel board. To express this integrated circuit device density on the panel board in another way, the panel board accommodates about 35 connector contact terminal posts in each square inch of panel board area.

With the development of what are called "medium scale" integrated circuit devices having many more circuit components per device, it would be expected that much larger panel board circuits could be built up within a selected panel board space. However, it is found that medium scale integrated circuit devices require additional terminals per device. Most important, it is also found that at least 0.100 inches is required between adjacent connector contact terminal posts on the panel board to permit wire-wrap connections to be made to each post without interference with adjacent posts on the panel board. As a result, it is found that, if a conventional panel board system incorporates medium scale integrated circuit devices and if the very desirable wire-wrapping technique is to be used to electrically interconnect the devices, only a limited number of the medium scale devices can be accommodated on the panel board. That is, the conventional panel board system would accommodate an estimated one-half circuit device on each square inch of the panel board area and much of the space advantage provided by use of the medium scale integrated circuit devices would not be realized.

It is an object of this invention to provide a novel and improved panel board system; to provide such a system incorporating novel medium scale integrated circuit devices; to provide such a system incorporating novel connectors for detachably mounting such integrated circuit devices on a panel board; to provide such a panel board system achieving improved device density on a panel board while permitting devices to be electrically interconnected by wire-wrapping techniques; and to provide such a panel board system which is of inexpensive manufacture.

Briefly described, the novel and improved panel board system of this invention comprises novel integrated circuit devices and novel connectors for detachably mounting the devices on a panel board. In each of the novel integrated circuit devices, an integrated circuit chip providing medium scale circuit integration in any conventional manner is mounted on a ceramic card, and terminals on the chip are electrically connected to printed circuit paths formed on the card. For the purpose of this invention, an integrated circuit device is considered to provide medium scale circuit integration if the device requires more than sixteen terminals. The printed circuit paths are arranged to terminate with approximately 0.050 inch center-to-center spacings between the paths along one edge of the card. Each novel connector of this invention is then adapted to receive an edge of the ceramic card of one of the integrated circuit devices, the connector having contacts on approximately 0.050 inch center-to-center spacings to detachably engage respective circuit path terminations along the edge of the ceramic card in the manner of an edge-board connector. In this regard, it is found that 0.050 center-to-center spacings are readily provided between circuit path terminations on the ceramic cards of the integrated circuit devices. These spacings are also readily provided between contact means in a socket or connector. In accordance with this invention, however, the connector contacts have terminal post portions which extend from the connectors through apertures in a panel board with 0.100 inch center-to-center spacings between the terminal posts. That is, while the connector contacts are arranged in a row at one side of the connector on 0.050 inch center-to-center spacings to engage respective circuit path terminations along an edge of the ceramic card in an integrated circuit device, the connector contacts have terminal portions of various configurations which extend in staggered relation from the connector to achieve a desired 0.100 inch minimum spacing between the posts, whereby the posts are spaced sufficiently from each other to be electrically interconnected by wire-wrapping techniques. In this way, it is found that medium scale integrated circuit devices are detachably mounted on a panel board with improved device density on the board but the connector terminal posts are arranged to permit inexpensive formation of high quality electrical interconnections between the device circuits by use of wire-wrapping techniques. For example, it is found that, where the medium scale integrated circuit devices each have as many as forty device terminals, more than two of such devices can be accommodated on each square inch of the panel board area while still permitting the device circuits to be electrically interconnected by use of the wire-wrapping techniques. To express this improved medium scale integrated circuit device density on a panel board in another way, more than 80 connector contact terminal posts can be arranged on each square inch of the panel board area while allowing sufficient space between the terminal posts to permit the posts to be electrically interconnected by wire-wrapping techniques.

Other objects, advantages and details of the novel panel board system and of the novel integrated circuit devices and connectors of this invention appear in the following more detailed description of preferred embodiments of the invention, the detailed description referring to the drawings in which:

FIG. 2 is a partial side elevation view of the integrated circuit device of FIG. 1;

Figure 1:
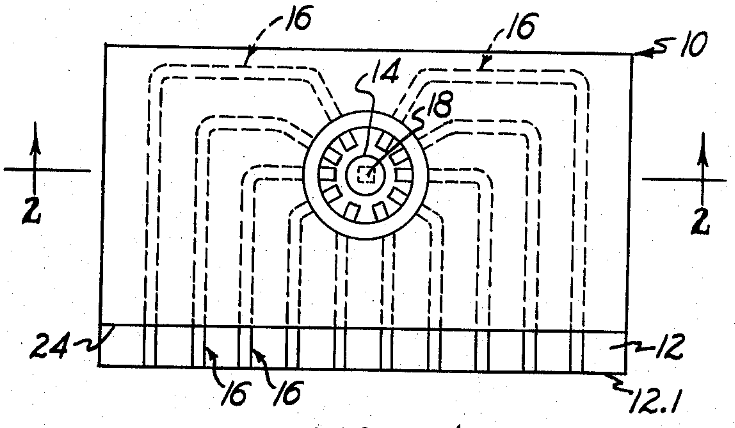
FIG. 1 is a plan view of the novel integrated circuit device of this invention.
Figure 3:
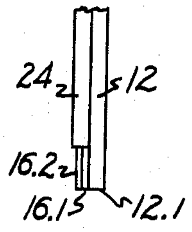
Figure 2:
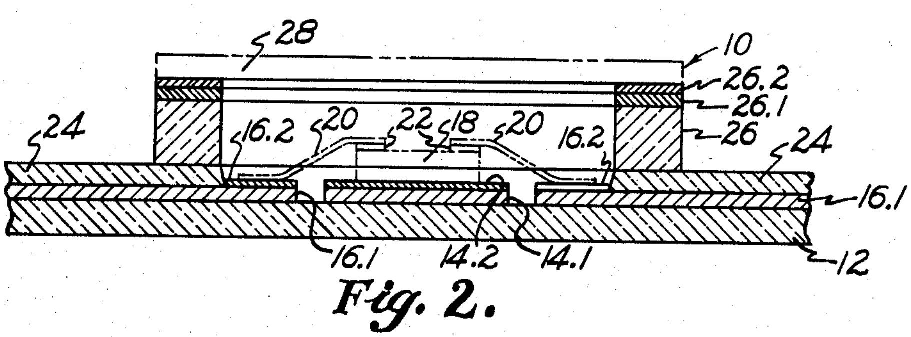
FIG. 2 is a partial section view to enlarged scale along line 2—2 of FIG. 1.

Referring to the drawings, 10 in FIGS. 1–4 indicates the novel and improved integrated circuit device of this invention which is shown to include a thin, rigid card 12 of ceramic or other dielectric material having a metal pad 14 and having a plurality of electrically conductive printed circuit paths 16 formed on one face of the card, the circuit paths extending from locations spaced around the pad 14 to terminate in spaced relation to each other along one edge 12.1 of the card. A chip 18 of semiconducting material or the like having an integrated circuit (preferably providing medium scale circuit integration) formed thereon is mounted on the pad 14, and lead wires, indicated by the broken lines 20 in FIG. 2, are electrically connected between the respective circuit paths 16 and the circuit terminals 22 on the chip 18.

The device 10 as above described is formed in any conventional manner according to this invention. For example, in a preferred embodiment to the invention, aluminum oxide or beryllium oxide powder is mixed with an epoxy binder and is press-formed into a card shape. The press-formed card is then baked at high temperature to form a card 12 of aluminum oxide or beryllium oxide ceramic material, the card preferably having broad surfaces about 2.00 inches long and 1.00 inches wide and having a thickness of about 0.040 inches. One of the broad card surfaces is then masked to leave portions of the card surface exposed to define the desired configuration of the pad 14 and of the circuit paths 16 on the card surface. Electrically conductive tungsten metal or the like in liquid form is wiped across the masked card surface to coat the exposed portions of the card surface and the coated card is baked or otherwise treated for removing the masking material and for adhering the metal coatings to the card to define the pad 14 and the electrically conductive circuit paths 16, these tungsten metal coatings being indicated at 14.1 and 16.1 in FIG. 2. A liquid glazing material 24 is then applied to the broad card surface to cover substantial areas of the card while leaving the pad 14 and the end portions of the circuit paths 16 exposed. While the glazing material is preferably still in liquid form, a ceramic ring 26, preferably formed in the same manner as the card 12 and having a tungsten metal coating on one annular surface thereof as indicated at 26.1 in FIG. 2, is applied to the glazing material around the pad 14 and around the portions of the circuit paths 16 which are exposed adjacent to the pad 14. The glazed card is then heated and cooled or otherwise treated for hardening the glazed, dielectric coating 24 to enclose substantial portions of the circuit paths 16 and to adhere the ceramic ring 26 to the glazed coating. The glazed card is then subjected to electroless plating or the like in conventional manner to deposit precious metal coatings or the like 14.2, 16.2 and 26.2 on the pad 14, on the end portions of the circuit paths 16, and on the ceramic ring 26. As will be understood, no precious metal is deposited on the ceramic material of the card 12 or on the glazed coating 24 in a conventional electroless plating process. In this arrangement, the integrated circuit chip 18, preferably formed of the semiconducting material such as silicon having an integrated circuit formed thereon in conventional manner, is readily bonded to the pad 14 by thermal compression bonding or the like. Similarly, lead wires 20 are readily connected to the plated ends of the circuit paths 16 adjacent to pad 14 and to the terminals 22 on the integrated circuit chip 18 by thermal compression bonding or the like for electrically interconnecting the chip terminals to the circuit paths. After connecting of the lead wires 20 in this manner, a cover member such as a metal plate or the like indicated by the broken lines 28 in FIG. 2, is bonded to the plating 26.2 on the ceramic ring 26 for enclosing and sealing the integrated circuit chip 18 as will be understood.

While a particular construction of the integrated circuit device 10 is described in detail by way of illustrating this invention, it should be understood that this invention includes all modifications and equivalents of the described device in which an integrated circuit chip is mounted on a ceramic or dielectric card and in which terminals of the integrated circuit device are electrically connected to electrically conductive circuit paths formed on the card to terminate in spaced relation to each other along the edge of the card. It should also be understood that although the device 10 as illustrated is shown to have ten circuit paths 16 terminating along one edge of the device, the number of circuit paths shown in the drawings has been limited for clarity of illustration. In the preferred embodiment of this invention, the device 10 incorporates a chip 18 which provides medium scale circuit integration, the card having on the order of forty circuit paths 16 formed thereon electrically connected to respective terminals 22 on the integrated circuit chip. For example, in a practical embodiment of this invention wherein the broad surface of the card 12 is 2.00 inches long and 1.00 inches wide, the 40 circuit paths 16 are preferably arranged to terminate along the card edge 12.1 with 0.050 inch center-to-center spacings between the path terminations.

Figure 4:
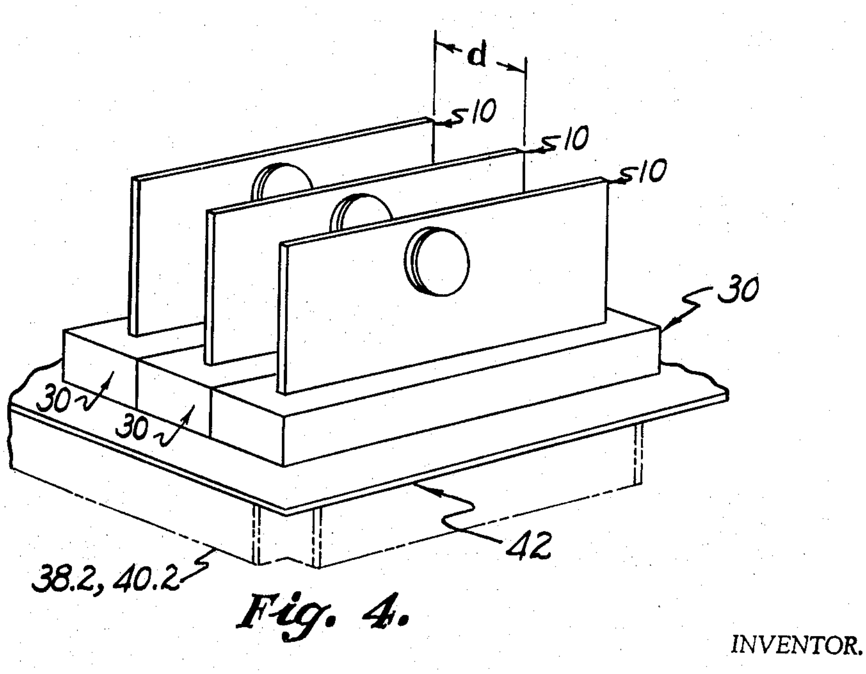
FIG. 4 is a prospective view of the novel panel board system of this invention.
Figure 5:
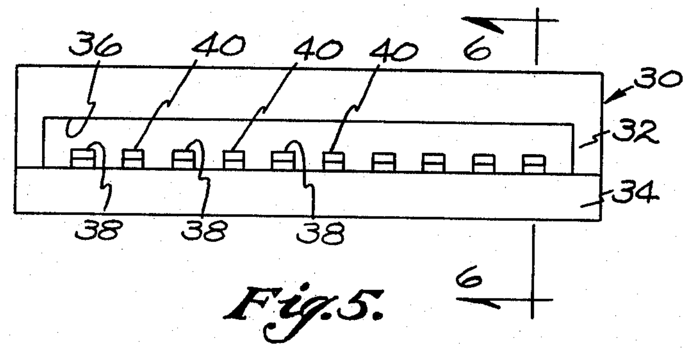
FIG. 5 is a side elevation view of the novel connector of this invention.
Figure 6:
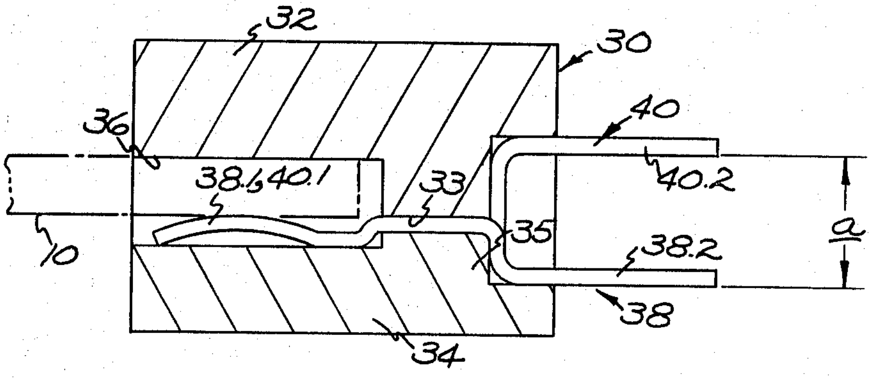
FIG. 6 is a section view to enlarged scale along line 6—6 of FIG. 5.

In accordance with this invention, the novel panel board system further incorporates novel connectors 30 which each preferably include two connector halves 32 and 34 of a dielectric material such as glass-filled nylon, the connector halves being bonded or otherwise secured together to define a recess 36 and to secure two different types of connector contacts 38 and 40 in alternate spaced relation to each other within the recess 36 as shown in FIGS. 5 and 6. The connector half 32 preferably has a plurality of grooves 33 adapted to fit over respective contacts 38 and 40 and the connector half 34 preferably has a plurality of keys or bosses 35 adapted to fit against the contacts 38 and 40 in the grooves 33 for retaining the contacts in the connector as shown in FIG. 6. That is, as shown in the drawings, the connector halves 32 and 34 define a recess 36 along one side 30.1 of the connector to receive an edge 12.1 of the ceramic card of an integrated circuit device 10 therein as indicated by the broken lines 10 in FIG. 6 and to releasably return the device 10 within the recess. (See also FIG. 4) The connector contacts 38 and 40, preferably formed of beryllium copper or phosphor bronze or the like, are each provided with a spring leave portion 38.1 and 40.1 which is disposed within the connector recess 36 along one side of the recess, whereby the spring leave portions of the contacts detachably engage the terminations of respective circuit paths 16 in the integrated circuit device 10 as will be understood. For example, where the integrated circuit device 10 has 40 circuit paths 16 terminating with 0.050 inch center-to-center spacings between the circuit paths along the edge of the integrated circuit device, the contact leave portions 38.1 and 40.1 in the connector 30 are also spaced with 0.050 inch center-to-center spacings between adjacent contacts in the recess 36.

In accordance with this invention, however, the contacts 38 and 40 in the connector 30 have terminal post portions 38.2 and 40.2 which are arranged to extend in different ways so that the terminal post portions extend in staggered, parallel relation to each other from the opposite side 30.2 of the connector, whereby a spacing *a* between the terminal posts of adjacent contacts 38 and 40 of approximately 0.100 inches is provided.

Figure 7:
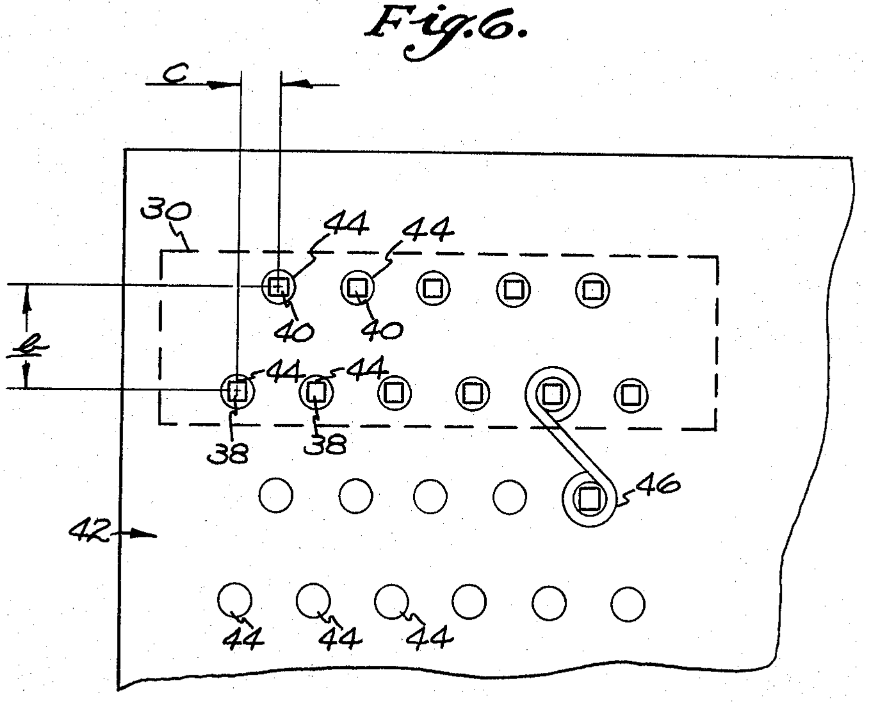
FIG. 7 is a partial bottom view of the panel board of this invention illustrating the advantages of the panel board system of this invention.

In the panel board system 41 of this invention as shown in FIG. 4, a plurality of the integrated circuit devices 10 are detachably mounted in respective connectors 30 on a panel board 42 so that the contact means 38 and 40 in the connectors detachably engage respective circuit path terminations of the integrated circuit devices as above described and so that the terminal post portions 38.2 and 40.2 of the connector contacts extend in parallel relation through the panel board as indicated by the broken lines 38.2, 40.2 in FIG. 4. That is, as is best illustrated in FIG. 7 which comprises a partial bottom view of the panel board 42, the panel board is provided with a plurality of apertures 44 arranged in rows with a spacing *b* of 0.100 inches between rows of apertures and with a spacing *c* of 0.050 inches between staggered apertures in adjacent rows. The panel board 42, preferably formed of fiberglass-filled epoxy or other stiff, dielectric material, is otherwise of conventional design. In this way, as indicated by the broken lines 30 in FIG. 7, the terminal posts 38.2 and 40.2 of one connector 30 are adapted to be received with a tight fit within a pair of adjacent rows of apertures in the panel board 42 with a minimum spacing of at least 0.100 inches between any two adjacent terminal posts. Thus, a large number of the integrated circuit devices 10 and connectors 30 are accommodated within a selected space on the panel board 42 while allowing sufficient space between the connector terminal posts to permit the posts to be interconnected by wire-wrapping techniques for electrically interconnecting the device circuits as indicated by the broken lines 4–6 in FIG. 7.

For example, where the medium scale integrated circuit device 10 incorporates forty circuit path terminations on 0.050 inch center-to-center spacings along the card edge 12.1 in the device, the connector 30 having contact means 38 and 40 on 0.050 center-to-center spacings detachably engaging the respective circuit path terminations of the device 10 is readily accommodated on a panel board area approximately 2.00 inches long and 0.200 inches wide while disposing the terminal posts of the connector with at least 0.100 inches between any two adjacent terminal posts. In this way more than two of the integrated circuit devices 10 are accommodated in each square inch of the panel board area. To express this integrated circuit device density on the panel board in another way, more than 80 connector contact terminal posts are accommodated in each square inch of the panel board area while providing sufficient space between the posts to permit the posts to be electrically interconnected by wire-wrapping techniques. In this regard, note that the device spacing described in this example provides 0.200 inch center-to-center spacings *d* between the devices 10 in the panel board system 41 shown in FIG. 4. If smaller device spacing is permitted, even more connector contact terminal posts 38.2 and 40.2 can be accommodated in each square inch of the panel board 42 while providing at least 0.100 inches between posts in accordance with this invention.

It should be understood that although particular embodiments of this invention have been described by way of the illustrations, this invention includes all modifications and equivalents of the illustrated embodiments falling within the scope of the appended claims.

What is claimed is:

1. A panel board system comprising:

a plurality of integrated circuit devices each embodying dielectric means, an integrated circuit chip having a plurality of chip terminals mounted on said dielectric means, and a plurality of electrically conductive paths disposed in electrically insulated relation to each other on said dielectric means, said conductive paths being electrically connected to respective chip terminals and terminating with first, selected, center-to-center spacings between said paths at one edge of said dielectric means;

a plurality of connectors each embodying dielectric body means and a plurality of electrical contact means disposed in electrically insulated relation to each other on said dielectric body means, each of said connectors having a recess receiving said one edge of one of said integrated circuit devices therein for mounting said integrated circuit device on said connector; said contact means in each of said connectors having first contact portions with said first center-to-center spacings therebetween detachably engaging respective terminations of said conductive paths on the integrated circuit device which is mounted on said connector, said contact means in each connector having respective terminal post portions extending from said connector in staggered parallel relation to each other with second, relatively larger center-to-center spacings between said terminal post portions of said contact means;

a dielectric panel board having apertures receiving said terminal post portions of said connector contact means therein for mounting said connectors on said panel board; and means electrically interconnecting selected terminal post portions of said connector contact means.

2. A panel board system as set forth in claim 1 wherein said first center-to-center spacings are less than 0.100 inches and said second center-to-center spacings are at least 0.100 inches, and wherein said selected terminal post portions of said connector contact means are electrically interconnected by wire wrap means.

3. A panel board system as set forth in claim 1 wherein said dielectric body means of each of said connectors has a recess therein receiving said one edge of one of said integrated circuit devices for mounting said integrated circuit device on said connector, and wherein said contact means in each of said connectors each embodies a resilient leaf portion and a terminal post portion, said contact means in each connector having said contact leaf portions disposed in a row within said body recess of said connector with said first center-to-center spacings between said leaf portions, said leaf portions detachably engaging respective terminations of said conductive paths on the integrated circuit device received within said recess.

4. A panel board system comprising:

a plurality of integrated circuit devices each embodying a rigid, dielectric card, an integrated circuit chip having a plurality of chip terminals mounted on one side surface of said card, and about 40 electrically conductive paths disposed in electrically insulated relation to each other on said one card surface, said conductive paths being electrically connected to respective chip terminals and terminating with about 0.050 inch center-to-center spacings between said paths at one edge of said one card surface;

a plurality of connectors mounting respective integrated circuit devices thereon, each of said connectors embodying dielectric body means having a recess receiving said one edge of one of said integrated circuit device cards therein for mounting said integrated circuit device on said connector, each of said connectors having a plurality of electrical contact members of two different configurations which each have a resilient leaf portion and a terminal post portion, each of said connectors having said contact members of said different configurations disposed in alternate, electrically insulated relation to each other on said dielectric body means of said connector and having said leaf portions of said contact members disposed in a row within said recess in said dielectric connector body means with said 0.050 inch center-to-center spacings between said contact leaf portions for detachably engaging respective terminations of said conductive paths on the integrated circuit device received within said recess; said contact members in each connector having said terminal post portions thereof extending from said connector is staggered parallel relation to each other with at least 0.100 inch center-to-center spacings between said terminal post portions;

a dielectric panel board having apertures receiving said terminal post portions of said connector contact members therein for mounting said connectors on said panel board; and wire wrap means electrically interconnecting selected terminal post portions of said connector contact members.

5. A connector for mounting an integrated circuit device on a panel board, said connector comprising a dielectric body means having a recess for receiving one edge of an integrated circuit device therein, and a plurality of electrical contact means mounted in electrically insulated relation to each other on said dielectric body means, said contact means each embodying a resilient leaf portion and a terminal post portion, said contact means having said leaf portions thereof disposed in a row within said recess with first center-to-center spacing therebetween for detachably engaging terminations of conductive paths on the integrated circuit device received within said recess, said terminal post portions of said contact means extending from said conductor in staggered parallel relation to each other with second, relatively larger center-to-center spacings therebetween.

6. A connector as set forth in claim 5 wherein said first center-to-center spacings of said contact leaf portions are less than 0.100 inches and wherein said second center-to-center spacings of said terminal post portions of said contact means are at least 0.100 inches.

* * * * *